United States Patent
Pump et al.

(10) Patent No.: US 12,445,673 B1
(45) Date of Patent: Oct. 14, 2025

(54) METHODS AND SYSTEMS FOR PROVIDING A PREFERRED CONTENT SOURCE INTERFACE

(71) Applicant: Comcast Cable Communications, LLC, Philadelphia, PA (US)

(72) Inventors: Alexandria Pump, Philadelphia, PA (US); Emily Colson, Middlesex (GB); Peter Yu, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/746,932

(22) Filed: Jun. 18, 2024

(51) Int. Cl.
*H04N 21/431* (2011.01)
*H04N 21/482* (2011.01)

(52) U.S. Cl.
CPC ..... *H04N 21/4312* (2013.01); *H04N 21/4826* (2013.01)

(58) Field of Classification Search
None
See application file for complete search history.

(56) References Cited

U.S. PATENT DOCUMENTS

| | | | |
|---|---|---|---|
| 7,480,746 B2 * | 1/2009 | Simon | H04L 12/282 710/63 |
| 9,516,254 B2 * | 12/2016 | Kim | G08C 23/04 |
| 10,168,867 B2 * | 1/2019 | Blanchard | G06F 3/0482 |
| 11,336,946 B1 | 5/2022 | Gheen | |
| 2002/0120932 A1 * | 8/2002 | Schwalb | H04L 67/51 725/139 |
| 2010/0144327 A1 * | 6/2010 | Karnalkar | H04M 7/0024 455/566 |
| 2016/0283055 A1 | 9/2016 | Haghighat et al. | |
| 2021/0084366 A1 | 3/2021 | Yun et al. | |
| 2022/0261534 A1 * | 8/2022 | Daga | G06Q 10/10 |

* cited by examiner

*Primary Examiner* — James R Marandi
(74) *Attorney, Agent, or Firm* — Ballard Spahr LLP

(57) ABSTRACT

Methods, apparatuses, and systems are described for providing a preferred content source interface. A default layout may be generated for a preferred content source interface. One or more content selections of a selected content service of a plurality of content services may be determined. The one or more content selections of the selected content service may be output according to the default layout of the preferred content source interface.

20 Claims, 11 Drawing Sheets

METHODS AND SYSTEMS FOR PROVIDING A PREFERRED CONTENT SOURCE INTERFACE

BACKGROUND

Customers have an increasing number of options for subscribing to streaming content services and an increasing number of streaming devices for accessing the content services. However, these content services have become fragmented, with a small number of content services that offer meaningful coverage of live content. Moreover, each content service provides its own unique interface layout for displaying its available content options to customers. With the availability of such a large amount of content services being offered via different unique interface layouts, customers often have to relearn a new interface layout each time he/she interacts with a new content service. In addition, service and device providers face the difficulty of keeping customers engaged with a specific application and from using another service provider's application. Lastly, conventional streaming devices do not provide an "always-on" video experience. Instead, conventional streaming devices require customers to return to a browser and aggregation interface after exiting and logging back on to the interface.

SUMMARY

It is to be understood that both the following general description and the following detailed description are exemplary and explanatory only and are not restrictive. Methods, systems, and apparatuses systems for providing a preferred content source interface.

A preferred content source interface may be generated according to a default layout of the preferred content source interface for displaying content selections of a preferred content service. A content service of a plurality of available content services may be determined as the preferred content service. The content selections of the preferred content service may be configured into the default layout of the preferred content source interface. The preferred content source interface may output the content selections according to the default layout, wherein the content selections of the preferred content service may be prioritized for display over content selections of other content services via the default layout of the preferred content source interface.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of the present description serve to explain the principles of the apparatuses and systems described herein.

DETAILED DESCRIPTION

Figure 1:
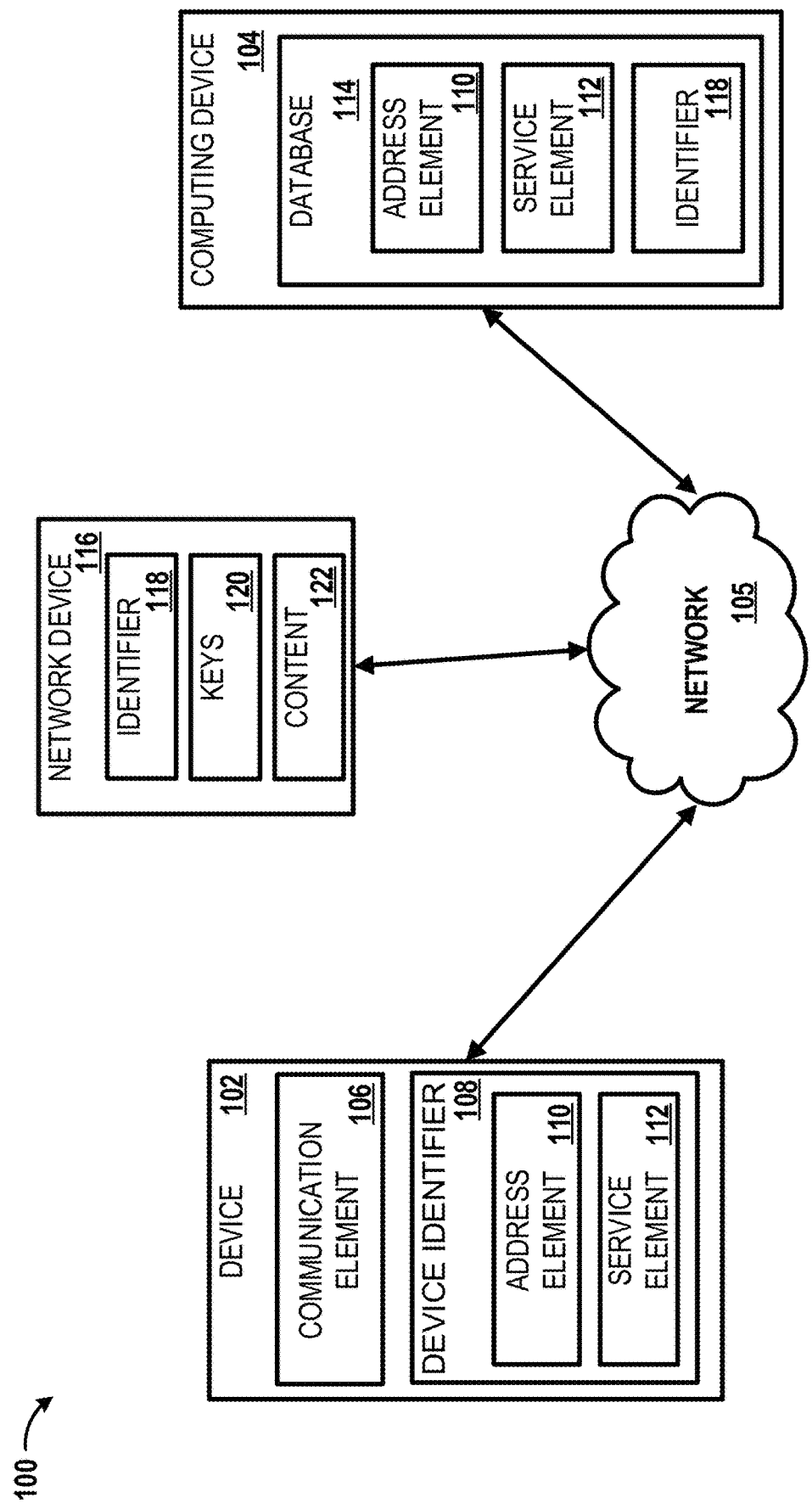
FIG. 1 shows an example system environment.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

This detailed description may refer to a given entity performing some action. It should be understood that this language may in some cases mean that a system (e.g., a computer) owned and/or controlled by the given entity is actually performing the action.

FIG. 1 shows an example system 100 for providing a preferred content source interface. For example, the system 100 may be configured to determine a default layout of a user interface (e.g., preferred content source interface) for outputting content selections of a content service (e.g., preferred content service). At least one content service of a plurality of content services may be selected designating the at least one content service as a preferred content service. The user interface may be configured to output the content selections of the at least one content service according to the default layout. The system 100 may be configured to provide services, such as network-related services, to a device (e.g., device 102). The network and system may comprise a device 102 in communication with a computing device 104, such as a server, via a network 105. The computing device 104 may be disposed locally or remotely relative to the device 102. As an example, the device 102 and the computing device 104 can be in communication via a private and/or public network 105 such as the Internet or a local area network (LAN). Other forms of communications can be used such as wired and wireless telecommunication channels, for example.

The device 102 may comprise a user device and/or a network device. The user device may comprise an electronic device such as a smart television, a computer, a smartphone, a laptop, a tablet, a set top box, a display device, or other device capable of communicating with the computing device 104.

The device 102 may comprise a communication element 106 for providing an interface to a user to interact with the device 102 and/or the computing device 104. The communication element 106 can be any interface for presenting and/or receiving information to/from the user, such as user feedback. An example interface may be a communication interface such as a web browser (e.g., Internet Explorer®, Mozilla Firefox®, Google Chrome®, Safari®, or the like). Other software, hardware, and/or interfaces can be used to provide communication between the user and one or more of the device 102 and the computing device 104. As an example, the communication element 106 can request or query various files from a local source and/or a remote source. As an example, the communication element 106 can transmit data to a local or remote device such as the computing device 104.

The device 102 may be associated with a user identifier or a device identifier 108. As an example, the device identifier 108 may be any identifier, token, character, string, or the like, for differentiating one user or user device (e.g., device 102) from another user or user device. In an example, the device identifier 108 may identify a user or user device as belonging to a particular class of users or user devices. As an example, the device identifier 108 may comprise information relating to the device 102 such as a manufacturer, a model or type of device, a service provider associated with the device 102, a state of the device 102, a locator, and/or a label or classifier. Other information can be represented by the device identifier 108.

The device identifier 108 may comprise an address element 110 and a service element 112. In an example, the address element 110 can comprise or provide an internet protocol address, a network address, a media access control (MAC) address, international mobile equipment identity (IMEI) number, international portable equipment identity (IPEI) number, an Internet address, or the like. As an example, the address element 110 can be relied upon to establish a communication session between the device 102 and the computing device 104 or other devices and/or networks. As an example, the address element 110 can be used as an identifier or locator of the device 102. In an example, the address element 110 can be persistent for a particular network.

The service element 112 may comprise an identification of a service provider associated with the device 102, with the class of device 102, and/or with a particular network 105 with which the device 102 is currently accessing services associated with the service provider. The class of the device 102 may be related to a type of device, capability of device, type of service being provided, and/or a level of service (e.g., business class, service tier, service package, etc.). As an example, the service element 112 may comprise information relating to or provided by a communication service provider (e.g., Internet service provider) that is providing or enabling data flow such as communication services to the device 102. As an example, the service element 112 may comprise information relating to a preferred service provider for one or more particular services relating to the device 102. In an example, the address element 110 can be used to identify or retrieve data from the service element 112, or vice versa. As an example, one or more of the address element 110 and the service element 112 may be stored remotely from the device 102 and retrieved by one or more devices such as the device 102 and the computing device 104. Other information may be represented by the service element 112.

The computing device 104 may comprise a server for communicating with the device 102 and/or a network device 116. As an example, the computing device 104 may communicate with the device 102 for providing data and/or services. As an example, the computing device 104 may provide services, such as network (e.g., Internet) connectivity, network printing, media management (e.g., media server), content services, streaming services, broadband services, or other network-related services. As an example, the computing device 104 may allow the device 102 to interact with remote resources, such as data, devices, and files. As an example, the computing device 104 may be configured as (or disposed at) a central location (e.g., a headend, or processing facility), which may receive content (e.g., data, input programming) from multiple sources. The computing device 104 may combine the content from the multiple sources and may distribute the content to user (e.g., subscriber) locations via a distribution system.

The computing device 104 may be configured to manage the communication between the device 102 and a database 114 for sending and receiving data therebetween. As an example, the database 114 may store a plurality of files (e.g., web pages), user identifiers or records (e.g., viewership statistics 132), or other information. As an example, the device 102 may request and/or retrieve a file from the database 114. In an example, the database 114 may store information relating to the device 102 such as the address element 110, the service element 112, and/or viewership statistics 132. As an example, the computing device 104 may obtain the device identifier 108 from the device 102 and retrieve information from the database 114 such as the address element 110, the service element 112, and/or viewership statistics 132. As an example, the computing device 104 may obtain the address element 110 from the device 102 and may retrieve the service element 112 from the database 114, or vice versa. Any information may be stored in and retrieved from the database 114. The database 114 may be disposed remotely from the computing device 104 and accessed via direct or indirect connection. The database 114 may be integrated with the computing device 104 or some other device or system.

A network device 116 may be in communication with a network, such as the network 105. For example, the network device 116 may facilitate the connection of a device (e.g., device 102) to the network 105. As an example, the network device 116 may be configured as a set-top box, a gateway device, or wireless access point (WAP). In an example, the network device 116 may be configured to allow one or more wireless devices to connect to a wired and/or wireless network using Wi-Fi, Bluetooth®, Zigbee®, or any desired method or standard.

The network device 116 may comprise an identifier 118. As an example, the identifier 118 may be or relate to an Internet Protocol (IP) Address (e.g., IPV4/IPV6) or a media access control address (MAC address) or the like. As an example, the identifier 118 may be a unique identifier for facilitating communications on the physical network segment. In an example, the network device 116 may comprise a distinct identifier 118. As an example, the identifier 118 may be associated with a physical location of the network device 116.

One or more devices (e.g., device 102, computing device 104, network device 116, etc.) may be configured to output a user interface (e.g., a preferred content source interface) that is configured to output (e.g., display) content selections offered by a content service according to a default layout. For example, a content service of a plurality of content services may be selected/designated as a preferred content service. The preferred content source interface may be configured to prioritize the output (e.g., the display) of the content selections of the selected content service (e.g., preferred content service) over the same content selections or other content selections offered by the other content services of the plurality of content services. The content selections of the selected content service may be displayed at a top portion of the preferred content source interface, displayed more prominently (e.g., highlighted) than other content selections offered by the other content services, or displayed as a first choice selection of a plurality of content selections of a content item offered by multiple content services. In addition, when a user performs a search via the preferred content source interface, search results associated with content of the selected content service may be prioritized over search results associated with content of the other content services. For example, the search results associated with the content of the selected content service may be displayed higher in a ranked list of the search results or more prominently than the search results associated with the other content services.

As an example, the content selections of the selected/preferred content service may be configured into a default layout of a plurality of content fields, wherein each content field of the plurality of content fields may be associated with, or configured to display, each content selection of the selected/designated content service. For example, each content service of the plurality of content services may have its own unique layout configuration for displaying each of its available content selections. The content selections of the selected content service (e.g., the preferred content service) may be reconfigured into the default layout of the preferred content source interface. In an example, the preferred content source interface may be output via an application program that may be installed/downloaded onto a user device (e.g., device 102, network 116, etc.). In an example, the user device may access the application program for outputting the preferred content source interface via a computing device (e.g., computing device 104, cloud computing, etc.) via the network 105. Content selections of a content service of a plurality of content services may be determined based on a selection of the content service that designates the selected content service as the preferred content service. In an example, the plurality of content services may be determined based on a plurality of subscriptions associated with a user accessing the user interface. In an example, the selection may be provided by a user via the user device. In an example, the selection may be determined by a computing device (e.g., computing device 104). For example, the computing device may determine a default content service associated with a user accessing the preferred content source interface based on one or more user preferences associated with the user or based on a default content service associated with the preferred content source interface. Each content service of the plurality of content services may comprise one or more linear content source selections (e.g., one or more broadcast channels) and one or more non-linear content item selections (e.g., on-demand content items, recorded content items, etc.). The preferred content source interface may output (e.g., display) the content selections of the selected/preferred content service according to the default layout. In an example, another content service of the plurality of content services may be selected. Based on the selection of the another content service, the preferred content source interface may discontinue outputting (e.g., displaying) the one or more content selections of the previously selected content service according to the layout and output (e.g., display) the one or more content selections of the newly selected another content service according to the default layout.

As an example, the preferred content source interface may be configured to output a last watched content selection when the preferred content source interface is initiated (e.g., when the device comprising the user interface is powered on). In an example, the preferred content source interface may be configured to display content of the last watched content selection that is currently being broadcast (e.g., live content). For example, the last watched content selection may comprise a linear content selection (e.g., a broadcast channel). The preferred content source interface may display the last watched broadcast channel when the preferred content source interface is initiated. In an example, the preferred content source interface may be configure to resume playback of a non-linear content item (e.g., on-demand content, recorded content, etc.). The preferred content source interface may resume playback of the on-demand content item, or provide an option for resuming the non-linear content item, when the user interface is initiated. A last watched content selection of the one or more content selections associated with the content service may be determined based a first user input. For example, a user of the preferred content source interface may power off the device (e.g., device 102, network device 116, etc.) outputting the user interface or close out the preferred content source interface. The content selection at the time the user powers off the device, or closes the preferred content source interface, may be determined as the last watched content selection. The preferred content source interface may output the content associated with the last watched content selection (e.g., via the selected preferred content service/source) based on a second user input. For example, a user may power on the device or reload/reinitiate the preferred content source interface. The content (e.g., linear content or a non-linear content item) associated with the last watched content selection may be displayed after the device is powered on and/or the preferred content source interface is reinitiated. As an example, the preferred content source interface may output the non-linear content item from a time point in the content item when the first input was received (e.g., a time point in the content item when the device was powered off or the preferred content source interface was closed).

As an example, if more than one content service is selected, a priority may be assigned to each content service. In an example, the selections of the plurality of content services may be received by the user device. A user of the user device may provide the selections of the plurality of content services and may rank each content service of the plurality of content services. In an example, the selections of the plurality of content services may be determined by the computing device. The computing device may determine a plurality of default content services associated with a user accessing the preferred content source interface and rank each content service of the plurality of default content services based on one or more user preferences associated with the user or based on default content services associated with the preferred content source interface. A user may provide user input selecting one of the content selections (e.g., one of the linear content items or non-linear content items) available via the preferred content source interface. Based on the user input, an availability of the content selection via one or more content services of the plurality of content services may be determined. For example, one or more of the plurality of content services may provide the content selection. The preferred content source interface may output content (e.g., a linear content item or a non-linear content item) associated with the content selection via a content service of the one or more content services based on the priority of each content service of the one or more content services. For example, a highest ranked content service of the one or more content services may be selected for providing the content selection.

As an example, a content service may only be included in a list of available content services for selection via the preferred content source interface based on a plurality of parameters associated with the content service. For example, the content service may be determined to be a qualified content service based on the plurality of parameters associated with the content service. The plurality of parameters may comprise one or more of a subscription requirement, a platform format, content availability, content entitlements, an ability to share data, an ability to support deeplinks. For example, the content service may be determined as a qualified content service and included in the list of available content services if the content service requires a subscription to access the content service, conforms to a predetermined platform standard (e.g., meets performance requirements/thresholds), provides a linear content line-up, shares user data (e.g., viewing/watch history), and/or supports an ability to support direct/deeplink tuning (e.g., using directional buttons to traverse content). Based on the determination that the content service is a qualified content service, the content service may be included as a selection of available content service selections via the preferred content source interface. One or more content selections of the content service may be output via the preferred content source interface based on a selection of the content service. The preferred content source interface may output the one or more content selections of the content service according to the default layout of the preferred content source interface. In an example, the content service may be removed from the list of available content service selections (e.g., qualified content service) based on a change of at least one parameter of the plurality of parameters. For example, a content service must maintain the plurality of parameters to remain in the list of available content service selections (e.g., qualified content service). For example, if the content service no longer requires a subscription to access the content service, no longer conforms to the platform standard, no longer provides a linear content line-up, no longer shares user data, and/or no longer supports direct/deeplink tuning, the content service may be removed from the list of available content service selections.

Figure 2:
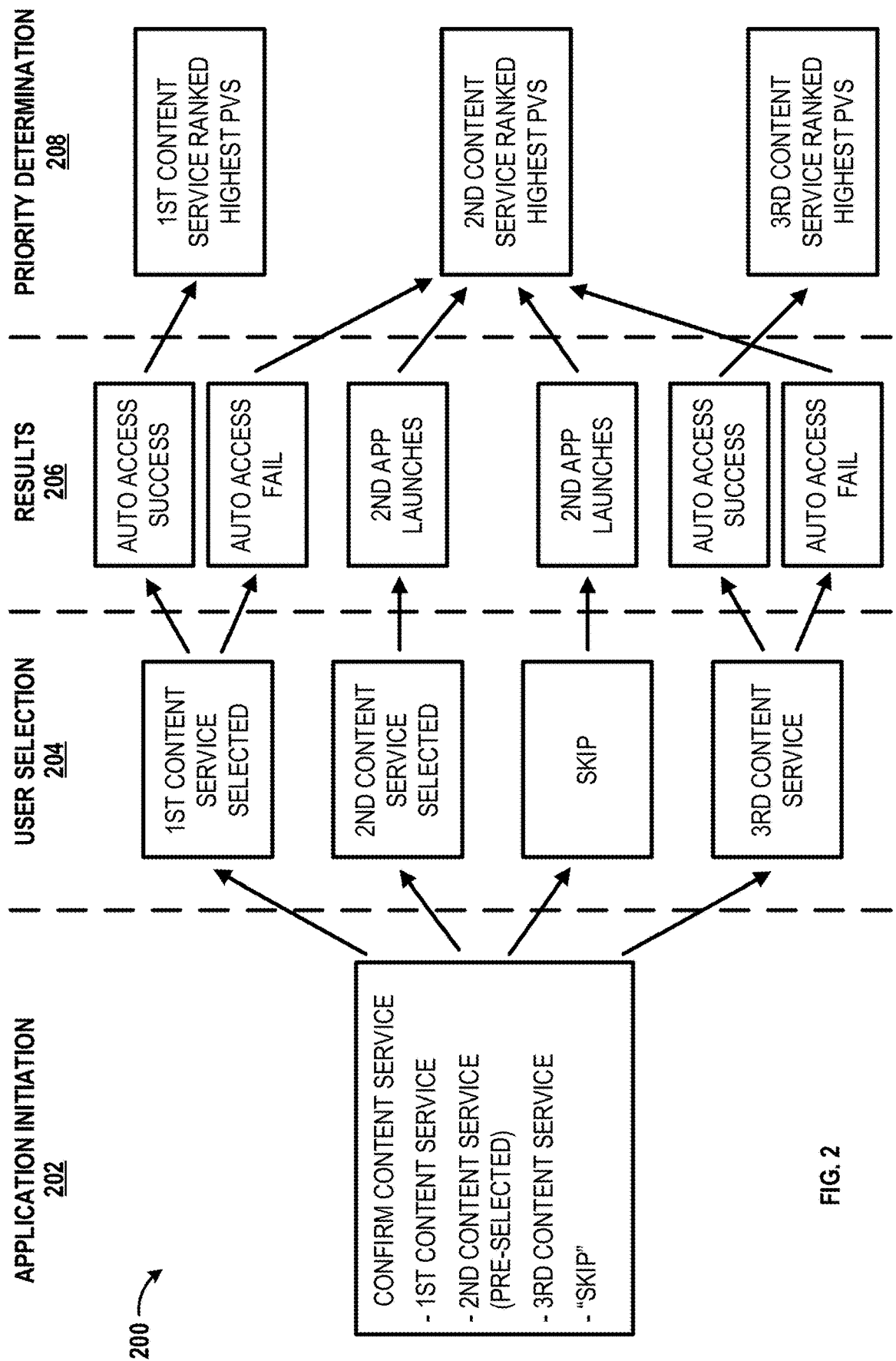
FIG. 2 shows an example process.

FIG. 2 shows an example process 200 for determining a preferred content service to be output according to a default layout of the preferred content source interface. As an example, the user interface (e.g., preferred content source interface) may be implemented via an application. At 202, when the application is first initiated, a user of the user interface may be provided with one or more options for selecting a content service as a preferred content service. For example, as shown in FIG. 2, the user interface may output options to select a first content service, a second content service, a third content service, and an option to skip selecting a content service as a preferred content service. In an example, the second content service may be a preselected, or default, content service of the user interface.

At 204, the user may provide a selection of one of the content service options or an option to skip selecting any of the content service options. Based on the user selection, at least one of the content service options may be selected as the preferred content service, or the highest ranked content service. For example, the user may provide a selection of the first content service option as the preferred content service at 204. At 206, it may be determined whether access to the first content service is available. As an example, a computing device (e.g., computing device 104, server, cloud computing, etc.) may determine if the user has access to the first content service based on accessing a unique identifier of the user's device (e.g., device 102, etc.). The computing device may that the unique identifier is associated with a subscription (e.g., access rights) to the first content service and grant access for the user to the first content service. If access to the first content service is available, at 208, the first content service may be determined as the preferred content service, or the highest ranked content service. If access to the first content service is unavailable, at 208, the second content service may be determined as the preferred content service, or the highest ranked content service, since the second content service is the pre-selected, or default, content service of the user interface.

Returning to 204, the user may provide a selection of the second content service as the preferred content service or provide a selection to skip selecting any of the content service options as the preferred content service. At 206, the second content service may automatically launch based on the user selection of the second content service or based on the user selection to skip selecting any of the content service options since the second content service is the pre-selected, or default, content service of the user interface. At 208, the second content service may be determined as the preferred content service, or the highest ranked content service.

Returning to 204, the user may select the third content service option. At 206, it may be determined whether access to the third content service is available. If access to the third content service is available, at 208, the third content service may be determined as the preferred content service, or the highest ranked content service. As an example, a computing device (e.g., computing device 104, server, cloud computing, etc.) may determine if the user has access to the first content service based on accessing a unique identifier of the user's device (e.g., device 102, etc.). The computing device may that the unique identifier is associated with a subscription (e.g., access rights) to the first content service and grant access for the user to the first content service. If access to the third content service is unavailable, at 208, the second content service may be determined as the preferred content service, or the highest ranked content service, since the second content service is the pre-selected, or default, content service of the user interface.

Figure 3:
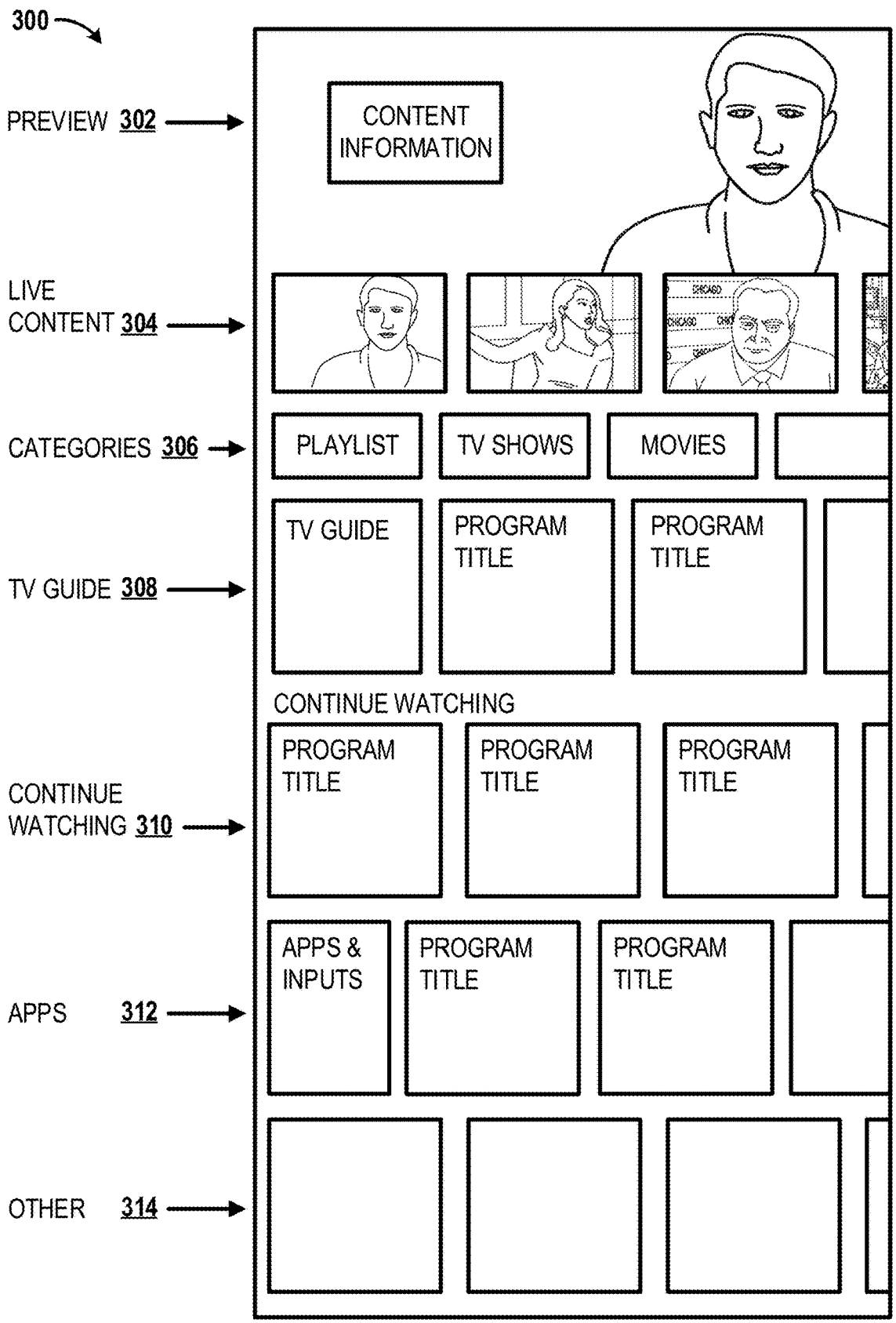
FIG. 3 shows an example user interface.

FIG. 3 shows an example user interface 300 (e.g., preferred content source interface). The user interface 300 may be configured according to a layout associated with a plurality of content fields for displaying one or more content selections (e.g., linear content selections or non-linear content selections) associated with a content service. For example, each content field of the plurality of content fields may be associated with, or display, each content selection of the one or more content selections associated with the content service. As an example, the user interface 300 may be configured to prioritize the output (e.g., the display) of the content selections of a selected content service over the same content selections or other content selections offered by other content services. For example, a content service of a plurality of content services may be selected/designated as a preferred content service. The content selections of the preferred content service may be displayed at a top portion of the user interface 300, displayed more prominently (e.g., highlighted) than other content selections offered by other content selections, or displayed as a first choice selection of a plurality of content selections of a content item offered by multiple content services. In addition, when a user performs a search via the user interface, search results associated with content of the preferred content service may be prioritized over search results associated with content of other content services. The search results associated with the content of the preferred content service may be displayed higher in a ranked list the search results or more prominently than the search results associated with the other content services.

As an example, the user interface 300 may comprise a preview section 302, a live content section 304, a content category section 306, a television guide section 308, a continue watching section 310, an application section 312, a section 314 for other types of content, and the like. It is to be understood that the example user interface 300 shown in FIG. 3 is not does not include an exhaustive list of sections that may be displayed via the user interface. The example user interface 300 may be configured to display any category of content in any section of the user interface 300. The preview section 302 may display a preview of highlighted content. For example, as a user scrolls through each content selection of the user interface 300, a preview of the selected content may be displayed in the preview section 302. In an example, the preview section 302 may display the last watched content selection (e.g., the last watched content selection when the user interface 300 was closed or the user device was powered off) when the user interface 300 is initiated or when the user device (e.g., device 102, network device 116, etc.) is powered on. In an example, linear content (e.g., live broadcast content) may be displayed in the preview section 302 as the user scrolls over the linear content selections. In an example, one or more portions of the non-linear content may be displayed in the preview section 302 as the user scrolls over the non-linear content selections. The live content section 304 may display (e.g., via a window or portion of the display) current content of the linear content items (e.g., broadcast channels). The content category section 306 may display options for selecting different categories (e.g., playlist, television shows, movies, children content, and the like) of content. The television guide section 308 may display an option for selecting a television guide that lists the available content (e.g., linear content items and non-linear content items) to the user via the user interface 300. The continue watching section 310 may display content items that were previously watched by the user. For example, the continue watching section 310 may provide the user an option to resume watching content at the time point in which the user stopped watching the content items (e.g., non-linear content items and/or linear content items). The application section 312 may display a list of available applications that the user may access. For example, the application section 312 may include applications associated with content services that have been determined as qualified content services. The user may select to switch the preferred content service of the user interface 300 to another content service via the application section 312. As a result, the user interface 300 may be reconfigured to display one or more content selections of the newly selected another content service according to the default layout and discontinue displaying the one or more content selections of the previously selected content service. The section 314 may display additional/other content, such as content that may be of interest to the user for example. The content may be determined based one or more user preferences of the user.

Figure 4:
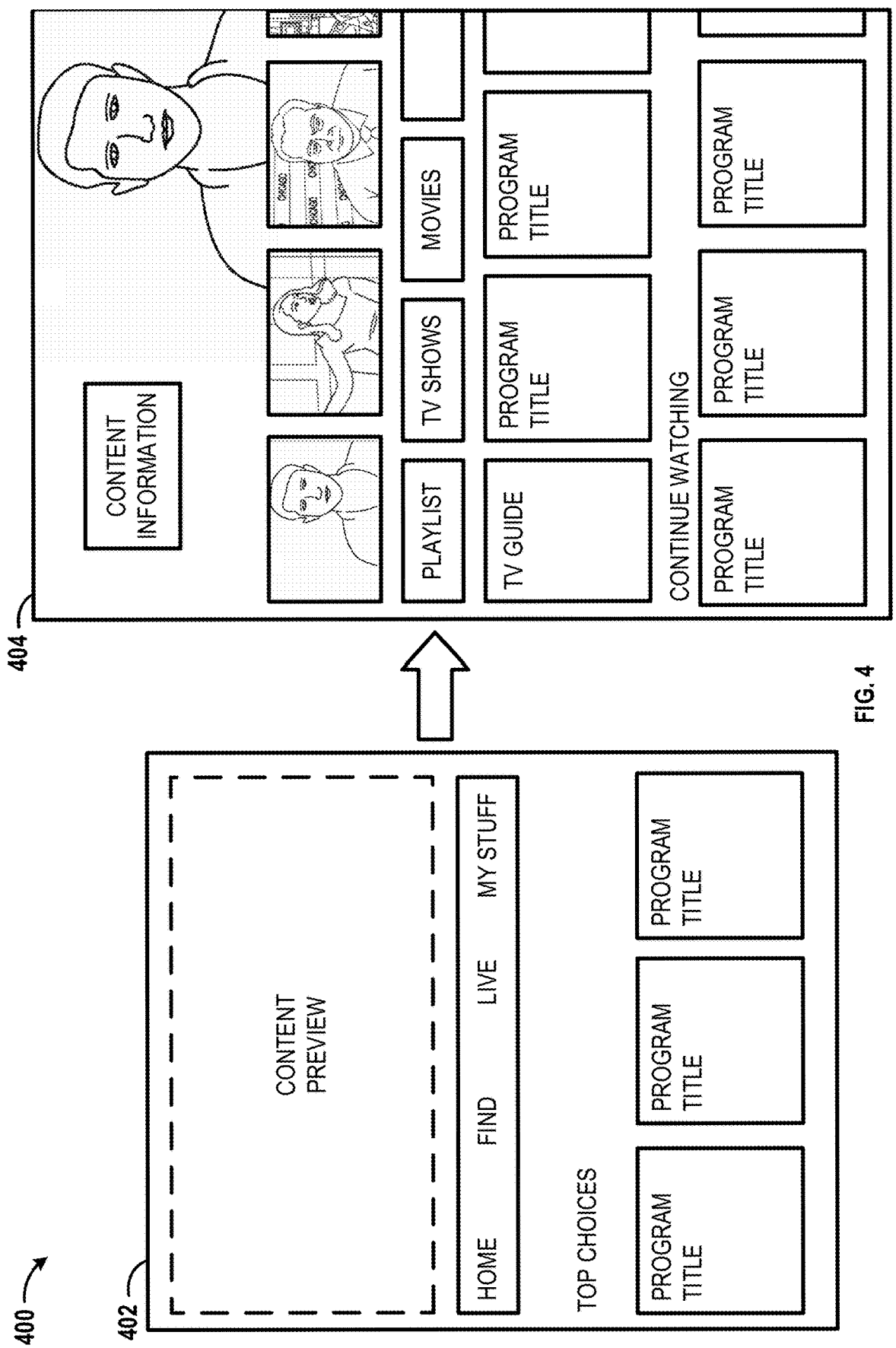
FIG. 4 shows an example reconfiguration of a user interface.

FIG. 4 shows an example reconfiguration 400 of a user interface 402, that may be output by a content service according to a unique layout of the content service, into the default layout of the preferred content source interface 404. As an example, as shown in FIG. 4, the content service may organize the content selections offered by the content service into the unique layout for output via the user interface 402 of the content service. In an example, the content service may organize a preview portion of the user interface 402 to display a preview of a highlighted content selection. For example, as a user scrolls through the content selections of the content service, highlighting the content selections, the preview of the highlighted content selection may be displayed in the preview section. In addition, the user interface 402 may output menu options for the user to select and a section showing content selections recommended to the user, such as based on the user's content preferences. The unique layout of the content selections of the content service may be reconfigured into the default layout of the preferred content source interface 404. For example, the content selections of the content service may be reorganized according to the default layout based on a selection designating the content service as a preferred content service. As shown in FIG. 4, the content selections output via the user interface 402 may be reorganized to display the content selections of the content service in different locations via the preferred content source interface 404. As an example, the content selections may be reorganized according to the default layout of preferred content source interface 300 shown in FIG. 3.

Figure 5:
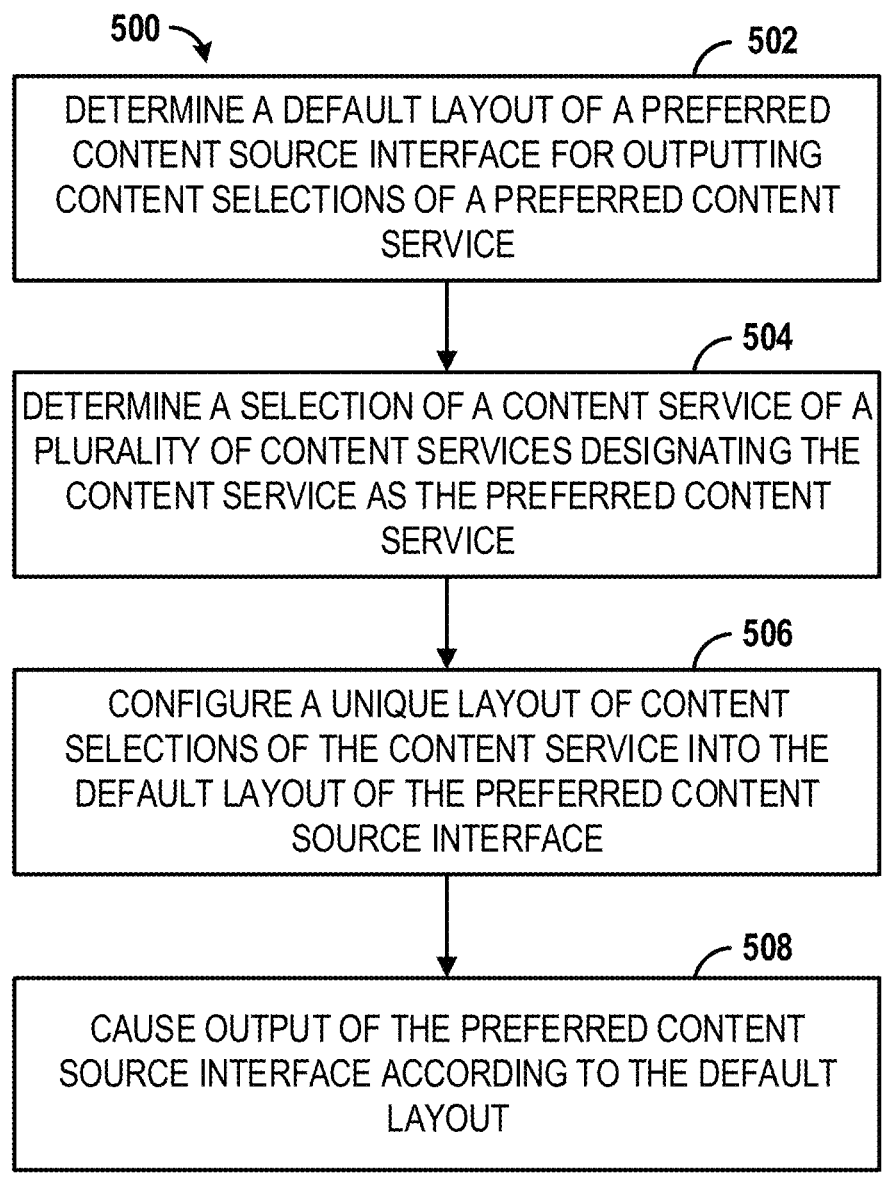
FIG. 5 shows a flowchart of an example method.

FIG. 5 shows an example method 500 for outputting one or more content selections of a preferred content service according to a layout of a preferred content source interface. Method 500 may be implemented by a computing device (e.g., the device 102, the computing device 104, or the network device 116, or any combination thereof). At step 502, a default layout of a preferred content source interface for outputting content selections of a preferred content service may be determined. For example, a computing device (e.g., the device 102, the computing device 104, or the network device 116, or any combination thereof) may determine the default layout of the preferred content source interface for outputting the content selections of the preferred content service.

At step 504, a selection of a content service of a plurality of content services that designates the content service as the preferred content service may be determined. For example, the computing device (e.g., the device 102, the computing device 104, or the network device 116, or any combination thereof) may determine the selection of the content service of the plurality of content services that designates the content service as the preferred content service. Each content service of the plurality of content services may organize content selections of the corresponding content service into a unique layout for output via an interface of the corresponding content service. For example, each content service may have its own layout configuration for displaying each of its content selections. Each content service of the plurality of content services may comprise at least one linear content source selection and at least one non-linear content item selection. The at least one linear content source selection may comprise a broadcast channel. In an example, the plurality of content services may be determined based on a plurality of user subscriptions associated with a user of the preferred content source interface. In an example, the selection of the at least one content service may be provided by the user via a user device (e.g., device 102, the network device 116, etc.). In an example, the selection of the at least one content service may be determined by a computing device (e.g., the computing device 104). For example, the computing device may determine a default content service associated with the user accessing the preferred content source interface based on one or more user preferences associated with the user or based on a default content service associated with the preferred content source interface.

At step 506, the unique layout of the content selections of the content service may be configured into the default layout of the preferred content source interface based on the selection of the content service. For example, the computing device (e.g., the device 102, the computing device 104, or the network device 116, or any combination thereof) may configure the unique layout of the content selections of the content service into the default layout of the preferred content source interface based on the selection of the content service. For example, the layout configuration of the content selections of the content service may be reconfigured into the default layout of the preferred content source interface. As an example, the content selections of the content service may be configured into a plurality of content fields of the default layout, wherein each content field of the plurality of content fields may be associated with, or configured to display, each content selection of the content service.

At step 508, the preferred content source interface may be output according to the default layout. For example, the computing device (e.g., the device 102, the computing device 104, or the network device 116, or any combination thereof) may cause the preferred content source interface to be output according to the default layout. In an example, the preferred content source interface may discontinue outputting the content selections of the content service according to the default layout based on a selection of another content service of the plurality of content services. The preferred content source interface may then output the content selections of the another content service according to the default layout. For example, the unique layout of the content selections of the another content service may be configured into the default layout of the preferred content source interface and the preferred content source interface may be output according to the default layout.

Figure 6:
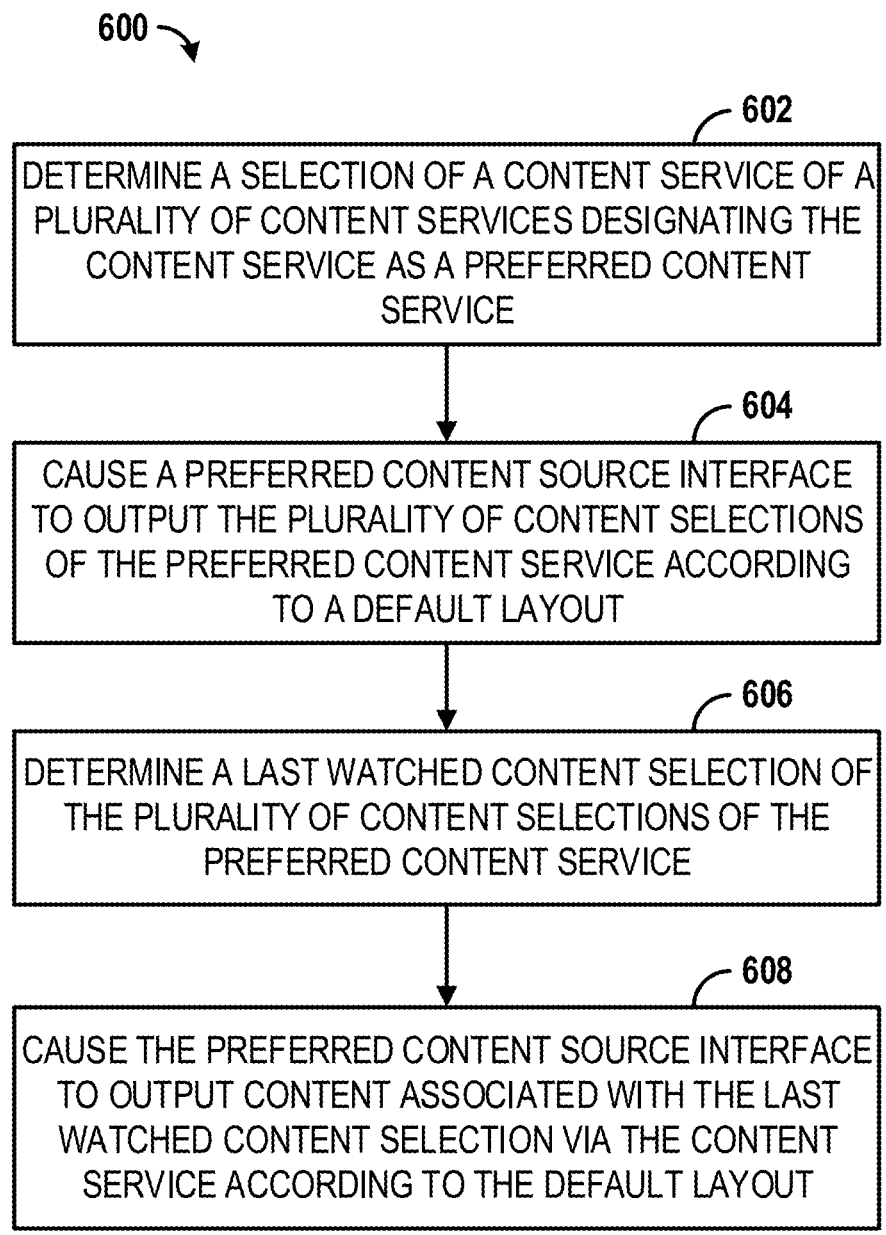
FIG. 6 shows a flowchart of an example method.

FIG. 6 shows an example method 600 for outputting one or more content selections of a preferred content service according to a layout of a preferred content source interface. Method 600 may be implemented by a computing device (e.g., the device 102, the computing device 104, or the network device 116, or any combination thereof). At step 602, a selection of a content service of a plurality of content services designating the content service as a preferred content service may be determined. For example, a computing device (e.g., the device 102, the computing device 104, or the network device 116, or any combination thereof) may determine the selection of the content service of the plurality of content services designating the content service as the preferred content service. Each content service of the plurality of content services may comprise a plurality of content selections. In an example, the plurality of content services may be determined based on a plurality of user subscriptions associated with a user. Each content service of the plurality of content services may comprise at least one linear content source selection and at least one non-linear content item selection. The at least one linear content source selection may comprise a broadcast channel. In an example, the selection of the at least one content service may be provided by the user via a user device (e.g., device 102, the network device 116, etc.). In an example, the selection of the at least one content service may be determined by a computing device (e.g., the computing device 104). For example, the computing device may determine a default content service associated with the user accessing the preferred content source interface based on one or more user preferences associated with the user or based on a default content service associated with the preferred content source interface.

At step 604, a preferred content source interface may be caused to output the plurality of content selections of the preferred content service according to a default layout. For example, the computing device (e.g., the device 102, the computing device 104, or the network device 116, or any combination thereof) may cause the preferred content source interface to output the plurality of content selections of the preferred content service according to the default layout. Each content service of the plurality of content services may organize content selections of the corresponding content service into a unique layout for output via an interface of the corresponding content service. For example, each content service may have its own layout configuration for displaying each of its content selections. The layout configuration of the content selections of the content service may be reconfigured into the default layout of the preferred content source interface. As an example, the content selections of the content service may be configured into a plurality of content fields of the default layout, wherein each content field of the plurality of content fields may be associated with, or configured to display, each content selection of the content service.

At step 606, a last watched content selection of the plurality of content selections the preferred content service may be determined based on a first user input. For example, the computing device (e.g., the device 102, the computing device 104, or the network device 116, or any combination thereof) may determine the last watched content selection of the plurality of content selections of the preferred content service based on the first user input. The first user input may comprise a power off command. The last watched content selection may comprise content associated with a non-linear content item or a linear content source.

At step 608, the preferred content source interface may output content associated with the last watched content selection via the preferred content service based on a second user input. For example, the computing device (e.g., the device 102, the computing device 104, or the network device 116, or any combination thereof) may cause the preferred content source interface to output content associated with the last watched content selection via the preferred content service based on the second user input. The second user input may comprise a power on command. In an example, causing the preferred content source interface to output content associated with the last watched content selection via the preferred content service may comprise causing the preferred content source interface to output the non-linear content item at a time point in the content when the first user input was received. In an example, causing the preferred content source interface may to output content associated with the last watched content selection via the preferred content service may comprise causing the preferred content source interface to output current content (e.g. broadcast content) of the linear content source.

Figure 7:
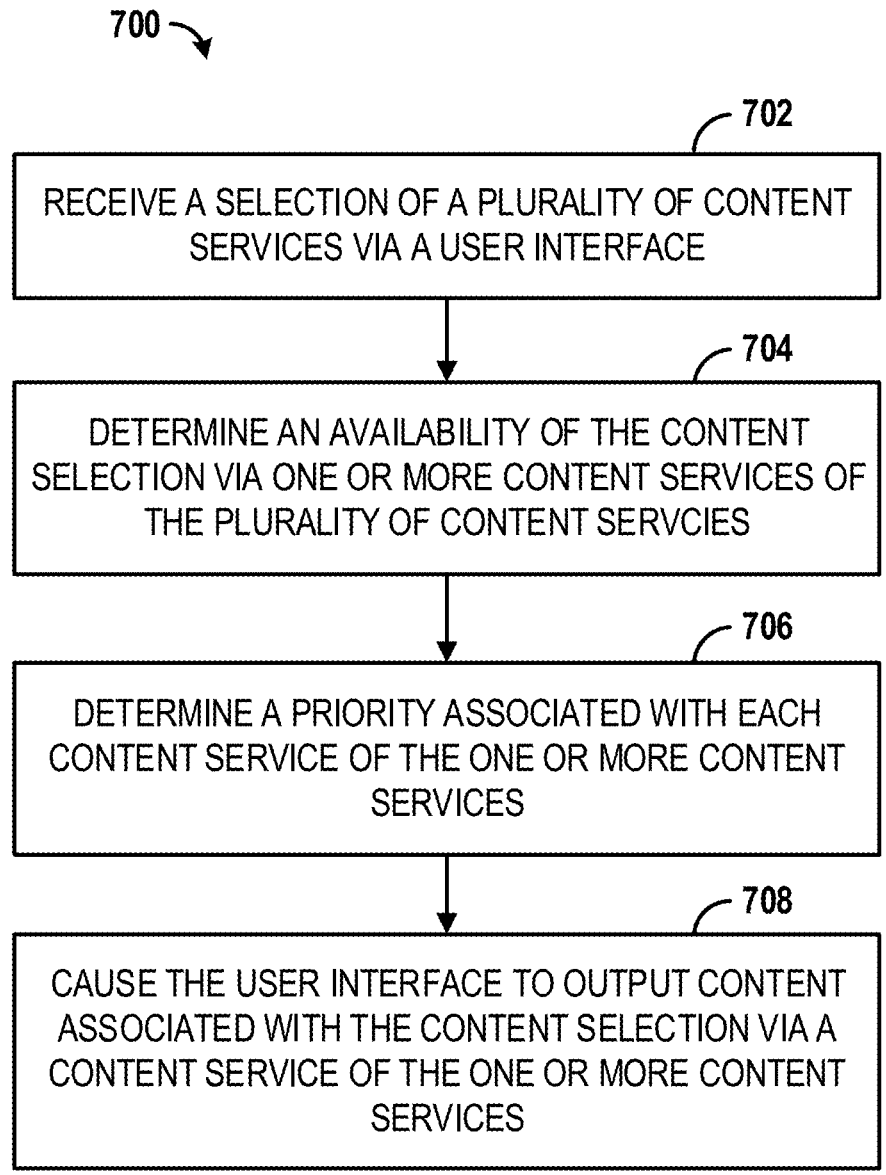
FIG. 7 shows a flowchart of an example method.

FIG. 7 shows an example method 700 for outputting one or more content selections of a preferred content service according to a layout of a preferred content source interface. Method 700 may be implemented by a computing device (e.g., the device 102, the computing device 104, or the network device 116, or any combination thereof). At step 702, a selection of a plurality of a plurality of content services may be received via a preferred content source interface. For example, the selection of the plurality of content services may be received by a computing device (e.g., the device 102, the computing device 104, or the network device 116, or any combination thereof) via the preferred content source interface. In an example, the plurality of content services may be determined based on a plurality of user subscriptions associated with a user. Each content service of the plurality of content services may comprise at least one linear content source selection and at least one non-linear content item selection. The at least one linear content source selection may comprise a broadcast channel. In an example, the selection of the plurality of content services may be provided by the user via a user device (e.g., device 102, the network device 116, etc.). The user of the user device may provide the selections of the plurality of content services and may rank each content service of the plurality of content services. In an example, the selection of the plurality of content services may be determined by a computing device (e.g., the computing device 104). The computing device may determine a plurality of default content services associated with the user accessing the preferred content source interface and may rank each content service of the plurality of default content services based on one or more user preferences associated with the user or based on default content services associated with the preferred content source interface.

At step 704, an availability of the content selection via one or more content services of the plurality of content services may be determined based on user input of a content selection. For example, the computing device (e.g., the device 102, the computing device 104, or the network device 116, or any combination thereof) may determine the availability of the content selection via the one or more content services of the plurality of content services based on the user input of the content selection.

At step 706, a priority associated with each content service of the one or more content services may be determined based on the availability of the content selection via the one or more content services of the plurality of content services. For example, the computing device (e.g., the device 102, the computing device 104, or the network device 116, or any combination thereof) may determine the priority associated with each content service of the one or more content services based on the availability of the content selection via the one or more content services of the plurality of content services. For example, since more than one content service was initially selected, a priority (e.g., based on the ranking of the content services) may be associated with each content service of the plurality of content services.

At step 708, the preferred content source interface may output content associated with the content selection via a content service of the one or more content services based on the priority associated with each content service. For example, the computing device (e.g., the device 102, the computing device 104, or the network device 116, or any combination thereof) may cause the preferred content source interface to output the content associated with the content selection via the content service of the one or more content services based on the priority associated with each content service. For example, a highest ranked content service of the one or more content services may be selected for providing the content selection. In an example, causing the preferred content source interface to output the content associated with the content selection via the content service may comprise causing the preferred content source interface to output one or more of a linear content item or a non-linear content item associated with the content selection via the content service.

Figure 8:
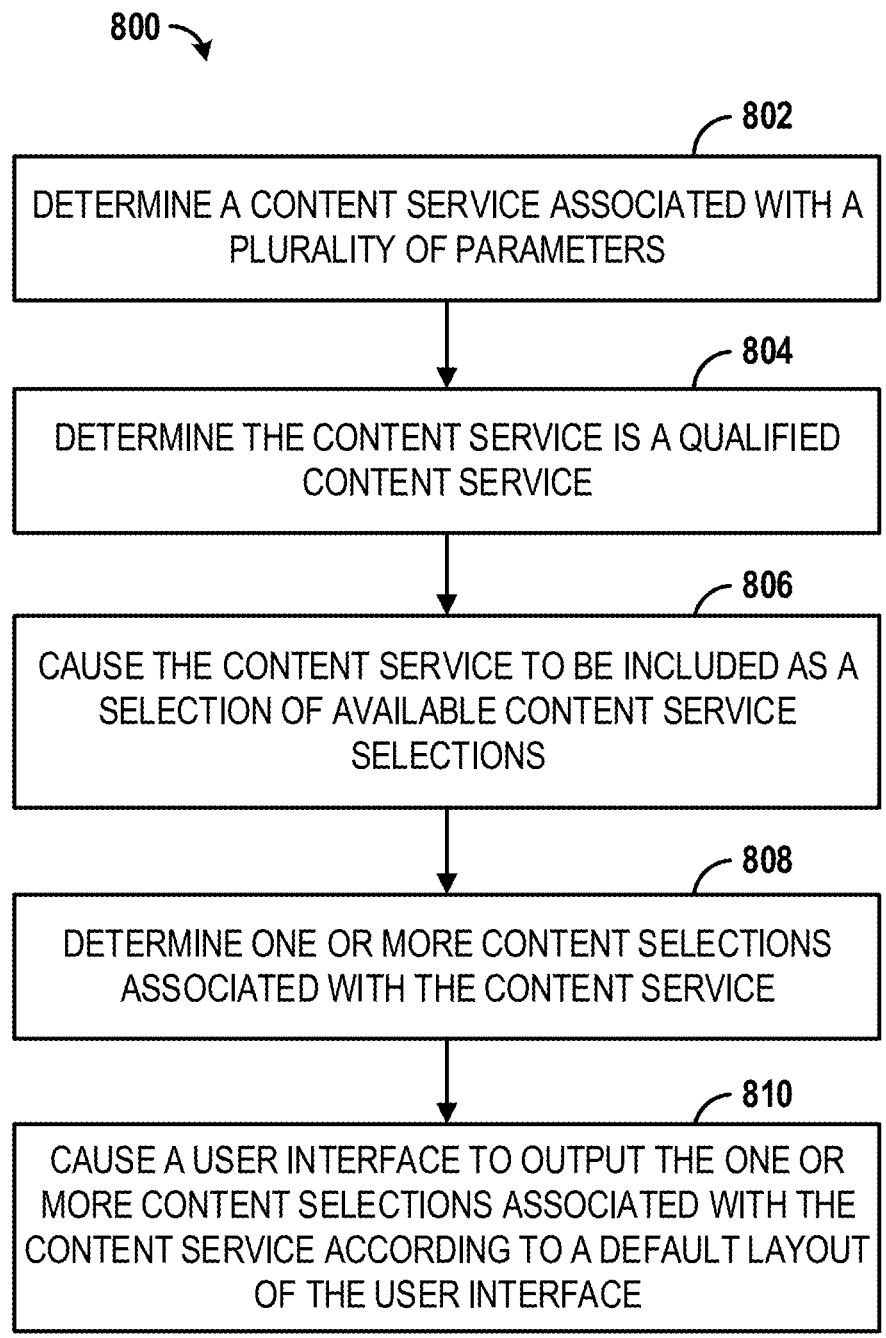
FIG. 8 shows a flowchart of an example method.

FIG. 8 shows an example method 800 for outputting one or more content selections of a preferred content service according to a layout of a preferred content source interface. Method 800 may be implemented by a computing device (e.g., the device 102, the computing device 104, or the network device 116, or any combination thereof). At step 802, a content service associated with a plurality of parameters may be determined. For example, a computing device (e.g., the device 102, the computing device 104, or the network device 116, or any combination thereof) may determine the content service associated with a plurality of parameters. The plurality of parameters may comprise one or more of a subscription requirement, a platform format, content availability, content entitlements, an ability to share data, or an ability to support deeplinks. The content availability may comprise one or more of linear content availability or non-linear content availability. The content service may comprise at least one linear content source selection and at least one non-linear content item selection.

At step 804, it may be determined that the content service is a qualified content service based on the plurality of parameters. For example, the computing device (e.g., the device 102, the computing device 104, or the network device 116, or any combination thereof) may determine that the content service is a qualified content service based on the plurality of parameters. For example, the content service may be determined as a qualified content service if the content service requires a subscription to access the content service, conforms to a predetermined platform standard (e.g., meets performance requirements/thresholds), provides a linear content line-up, shares user data (e.g., viewing/watch history), and/or supports an ability to support direct/deeplink tuning (e.g., using directional buttons to traverse content).

At step 806, the content service may be included as a selection of available content service selections based on the determination that the content service is a qualified content service. For example, the computing device (e.g., the device 102, the computing device 104, or the network device 116, or any combination thereof) may cause the content service to be included as a selection of available content service selections based on the determination that the content service is a qualified content service. Each content service of the available content service selections may comprise at least one linear content source selection and at least one non-linear content item selection. The at least one linear content source selection may comprise a broadcast channel.

At step 808, one or more content selections associated with the content service may be determined based on a selection of the content service. For example, the computing device (e.g., the device 102, the computing device 104, or the network device 116, or any combination thereof) may determine the one or more content selections associated with the content service based on the selection of the content service. In an example, the selection of the content service may be provided by a user via a user device (e.g., device 102, the network device 116, etc.). In an example, the selection of the content service may be determined by a computing device (e.g., the computing device 104). For example, the computing device may determine the content service as a default content service associated with the user accessing a preferred content source interface based on one or more user preferences associated with the user or based on a default content service associated with the preferred content source interface.

At step 810, the preferred content source interface may output the one or more content selections associated with the content service according to a default layout of the preferred content source interface. For example, the computing device (e.g., the device 102, the computing device 104, or the network device 116, or any combination thereof) may cause the preferred content source interface to output the one or more content selections associated with the content service according to a default layout of the preferred content source interface. For example, each content service may have its own layout configuration for displaying each of its content selections. The content selections of the content service may be reconfigured and displayed according to the default layout of the preferred content source interface.

Figure 9:
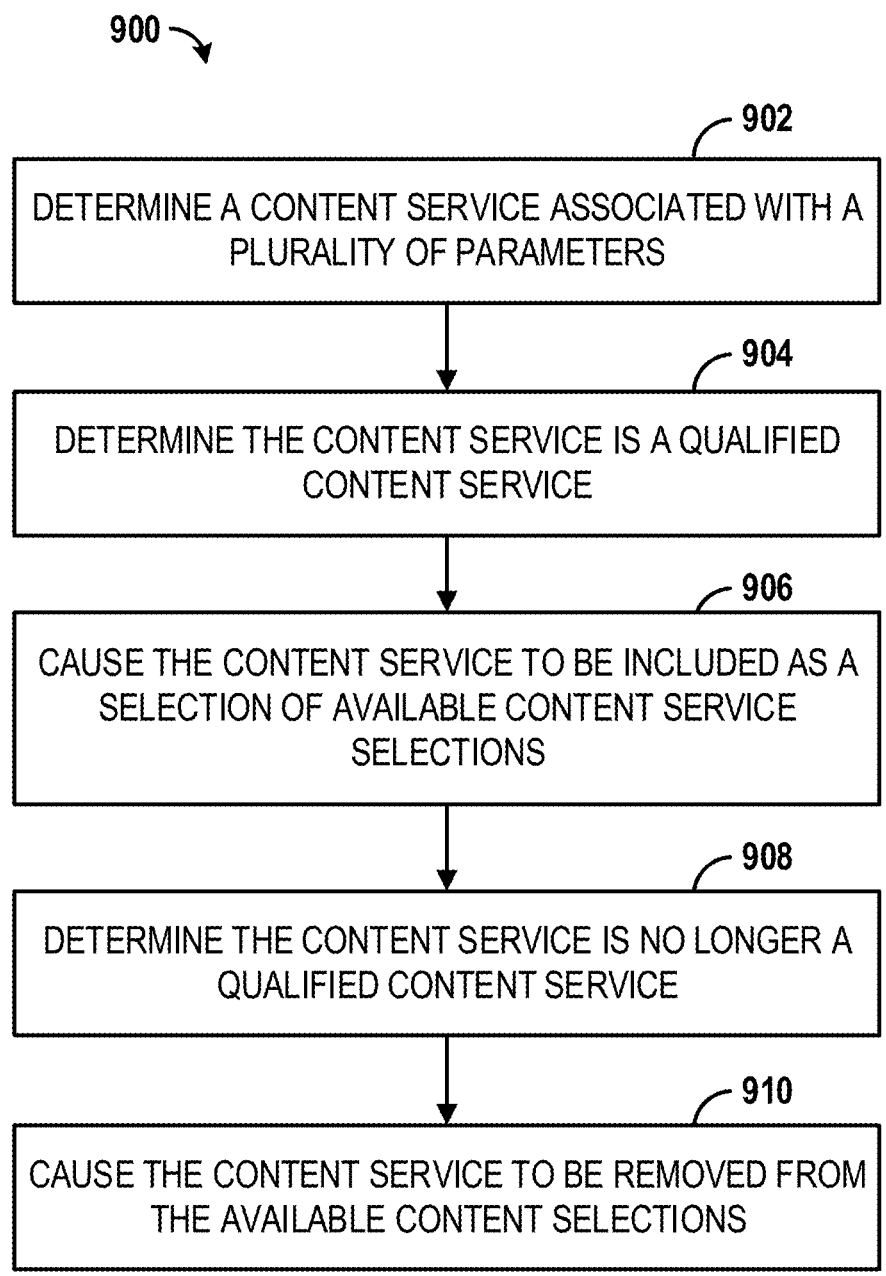
FIG. 9 shows a flowchart of an example method.

FIG. 9 shows an example method 900 for outputting one or more content selections of a preferred content service according to a layout of a preferred content source interface. Method 900 may be implemented by a computing device (e.g., the device 102, the computing device 104, or the network device 116, or any combination thereof). At step 902, a content service associated with a plurality of parameters may be determined. For example, a computing device (e.g., the device 102, the computing device 104, or the network device 116, or any combination thereof) may determine the content service associated with a plurality of parameters. The plurality of parameters may comprise one or more of a subscription requirement, a platform format, content availability, content entitlements, an ability to share data, or an ability to support deeplinks. The content availability may comprise one or more of linear content availability or non-linear content availability. The content service may comprise at least one linear content source selection and at least one non-linear content item selection.

At step 904, it may be determined that the content service is a qualified content service based on the plurality of parameters. For example, the computing device (e.g., the device 102, the computing device 104, or the network device 116, or any combination thereof) may determine that the content service is a qualified content service based on the plurality of parameters. For example, the content service may be determined as a qualified content service if the content service requires a subscription to access the content service, conforms to a predetermined platform standard (e.g., meets performance requirements/thresholds), provides a linear content line-up, shares user data (e.g., viewing/watch history), and/or supports an ability to support direct/deeplink tuning (e.g., using directional buttons to traverse content).

At step 906, the content service may be included as a selection of available content service selections based on the determination that the content service is a qualified content service. For example, the computing device (e.g., the device 102, the computing device 104, or the network device 116, or any combination thereof) may cause the content service to be included as a selection of available content service selections based on the determination that the content service is a qualified content service. Each content service of the available content service selections may comprise at least one linear content source selection and at least one non-linear content item selection. The at least one linear content source selection may comprise a broadcast channel.

At step 908, it may be determined that the content service is no longer a qualified content service based on a change of at least one parameter of the plurality of parameters. For example, the computing device (e.g., the device 102, the computing device 104, or the network device 116, or any combination thereof) may determine that the content service is no longer the qualified content service based on the change of the at least one parameter of the plurality of parameters. For example, it may be determined that the content service is no longer a qualified content service if the content service no longer requires a subscription to access the content service, no longer conforms to the platform standard, no longer provides a linear content line-up, no longer shares user data, and/or no longer supports direct/deeplink tuning.

At step 910, the content service may be removed from the available content service selections based on the determination that the content service is no longer a qualified content service. For example, the computing device (e.g., the device 102, the computing device 104, or the network device 116, or any combination thereof) may cause the content service to be removed from the available content service selections based on the determination that the content service is no longer a qualified content service.

Figure 10:
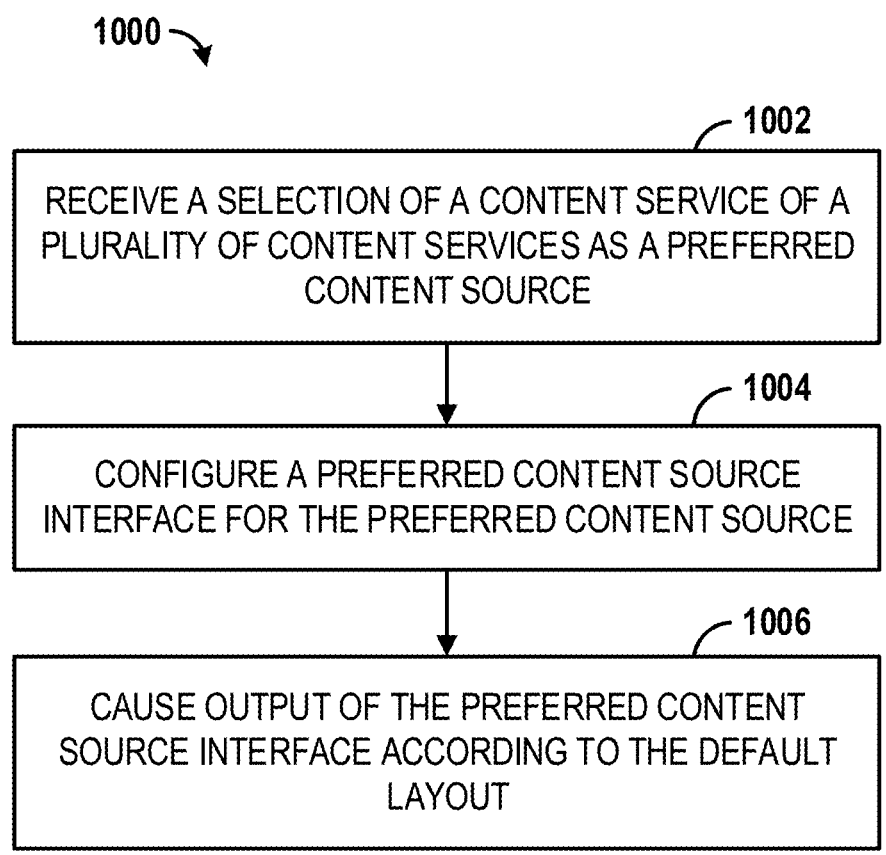
FIG. 10 shows a flowchart of an example method.

FIG. 10 shows an example method 1000 for outputting one or more content selections of a preferred content service according to a layout of a preferred content source interface. Method 900 may be implemented by a computing device (e.g., the device 102, the computing device 104, or the network device 116, or any combination thereof). At step 1002, a selection of a content service of a plurality of content services as a preferred content source may be received. For example, a computing device (e.g., the computing device 104) may receive the selection of the content service of the plurality of content services as the preferred content source from a user device (e.g., the device 102, the network device 116, etc.). Each content service of the plurality of content services may comprise a plurality of content selections. Each content service of the plurality of content services may further comprise at least one linear content source selection and at least one non-linear content item selection. The at least one linear content source selection may comprise a broadcast channel. In an example, the plurality of content services may be determined based on a plurality of user subscriptions associated with a user.

At step 1004, a preferred content source interface may be configured for the preferred content source. For example, the computing device (e.g., the device 102, the computing device 104, or the network device 116, or any combination thereof) may configure the preferred content source interface for the preferred content source. In an example, configuring the preferred content source interface may comprise configuring the content selections of the content service into a default layout of a plurality of content fields. Each content field of the plurality of content fields may be associated with each content selection of the content service.

At step 1006, the preferred content source interface may be output according to the default layout. For example, the computing device (e.g., the device 102, the computing device 104, or the network device 116, or any combination thereof) may cause the output of the preferred content source interface according to the default layout. In an example, causing output of the preferred content source interface according to the default layout may comprise displaying each content selection in each content field of the plurality of content fields according to the default layout. In an example, causing output of the preferred content source interface according to the default layout may comprise providing the preferred content source interface to a user device. The user device may display the preferred content source interface according to the default layout. In an example, another selection of another content service of the plurality of content services as a new preferred content source may be received. The preferred content source interface to may be reconfigured for the new preferred content source based on the another selection. Reconfiguring the preferred content source interface may comprise configuring the content selections of the another content service into the default layout of the plurality of content fields. Each content field of the plurality of content fields may be updated to be associated with each content selection of the another content service.

Figure 11:
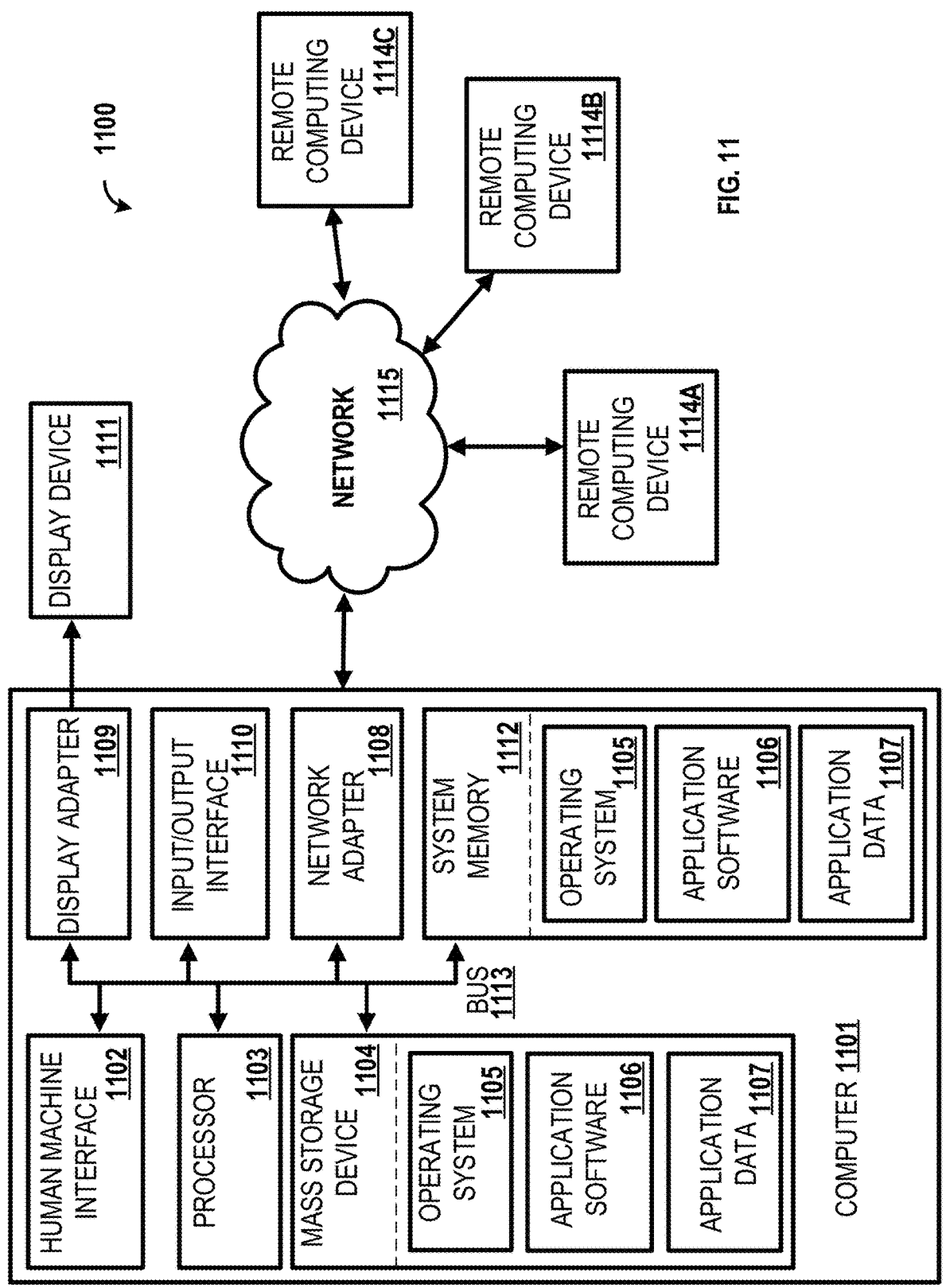
FIG. 11 shows a block diagram of an example system and computing device.

The methods and systems can be implemented on a computer 1101 as illustrated in FIG. 11 and described below. By way of example, computing device 104, device 102, and/or the network device 116 of FIG. 1 can be a computer 1101 as illustrated in FIG. 11. Similarly, the methods and systems disclosed can utilize one or more computers to perform one or more functions in one or more locations. FIG. 11 is a block diagram illustrating an example operating environment 1100 for performing the disclosed methods. This example operating environment 1100 is only an example of an operating environment and is not intended to suggest any limitation as to the scope of use or functionality of operating environment architecture. Neither should the operating environment 1100 be interpreted as having any dependency or requirement relating to any one or combination of components illustrated in the example operating environment 1100.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, and/or the like that perform particular tasks or implement particular abstract data types. The disclosed methods can also be practiced in grid-based and distributed computing environments where tasks are performed by remote processing devices that are linked through a communications network. In a distributed computing environment, program modules can be located in local and/or remote computer storage media such as memory storage devices.

Further, one skilled in the art will appreciate that the systems and methods disclosed herein can be implemented via a general-purpose computing device in the form of a computer 1101. The computer 1101 can comprise one or more components, such as one or more processors 1103, a system memory 1112, and a bus 1113 that couples various components of the computer 1101 comprising the one or more processors 1103 to the system memory 1112. The system can utilize parallel computing.

The bus 1113 can comprise one or more of several possible types of bus structures, such as a memory bus, memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM- CIA), Universal Serial Bus (USB) and the like. The bus 1113, and all buses specified in this description can also be implemented over a wired or wireless network connection and one or more of the components of the computer 1101, such as the one or more processors 1103, a mass storage device 1104, an operating system 1105, application software 1106, application data 1107, a network adapter 1108, the system memory 1112, an Input/Output Interface 1110, a display adapter 1109, a display device 1111, and a human machine interface 1102, can be contained within one or more remote computing devices 1114A-1114C at physically separate locations, connected through buses of this form, in effect implementing a fully distributed system.

The computer 1101 typically comprises a variety of computer readable media. Examples of readable media can be any available media that is accessible by the computer 1101 and comprises, for example and not meant to be limiting, both volatile and non-volatile media, removable and non-removable media. The system memory 1112 can comprise computer readable media in the form of volatile memory, such as random access memory (RAM), and/or non-volatile memory, such as read only memory (ROM). The system memory 1112 typically can comprise data such as the application data 1107 and/or program modules such as the operating system 1105 and the application software 1106 that are accessible to and/or are operated on by the one or more processors 1103.

In another aspect, the computer 1101 can also comprise other removable/non-removable, volatile/non-volatile computer storage media. The mass storage device 1104 can provide non-volatile storage of computer code, computer readable instructions, data structures, program modules, and other data for the computer 1101. For example, the mass storage device 1104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 1104, such as, by way of example, the operating system 1105 and the application software 1106. One or more of the operating system 1105 and the application software 1106 (or some combination thereof) can comprise elements of the programming and the application software 1106. The application data 1107 can also be stored on the mass storage device 1104. The application data 1107 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple locations within the network 1115.

In another aspect, the user can enter commands and information into the computer 1001 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices can be connected to the one or more processors 1103 via the human machine interface 1102 that is coupled to the bus 1113, but can be connected by other interface and bus structures, such as a parallel port, game port, an IEEE 1394 Port (also known as a Firewire port), a serial port, a network adapter 1108, and/or a universal serial bus (USB).

In yet another aspect, the display device 1111 can also be connected to the bus 1113 via an interface, such as the display adapter 1109. It is contemplated that the computer 1101 can have more than one display adapter 1109 and the computer 1101 can have more than one display device 1111. For example, the display device 1111 can be a monitor, an LCD (Liquid Crystal Display), light emitting diode (LED) display, television, smart lens, smart glass, and/or a projector. In addition to the display device 1111, other output peripheral devices can comprise components such as speakers (not shown) and a printer (not shown) which can be connected to the computer 1101 via an Input/Output Interface 1110. Any step and/or result of the methods can be output in any form to an output device. Such output can be any form of visual representation, comprising, but not limited to, textual, graphical, animation, audio, tactile, and the like. The display device 1111 and the computer 1101 can be part of one device, or separate devices.

The computer 1101 can operate in a networked environment using logical connections to one or more remote computing devices 1114A-1114C. By way of example, a remote computing device 1114A-1114C can be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computer 1101 and a remote computing device 1114A-1114C can be made via a network 1115, such as a local area network (LAN) and/or a general wide area network (WAN). Such network connections can be through the network adapter 1108. The network adapter 1108 can be implemented in both wired and wireless environments. Such networking environments are conventional and commonplace in dwellings, offices, enterprise-wide computer networks, intranets, and the Internet.

For purposes of illustration, application programs and other executable program components such as the operating system 1105 are illustrated herein as discrete blocks, although it is recognized that such programs and components can reside at various times in different storage components of the computing device 1101, and are executed by the one or more processors 1103 of the computer 1101. An implementation of the application software 1106 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" can comprise volatile and non-volatile, removable and non-removable media implemented in any methods or technology for storage of information such as computer readable instructions, data structures, program modules, or other data. Example computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques comprise, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, such as: matters of logic with respect to arrangement of steps or operational flow; plain meaning derived from grammatical organization or punctuation; the number or type of embodiments described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as examples only, with a true scope and spirit being indicated by the following claims.

What is claimed is:

1. A method comprising:
   determining, by a computing device, a default layout of a preferred content source interface for outputting content selections of a preferred content service;
   determining a selection of a content service of a plurality of content services designating the content service as the preferred content service, wherein each content service of the plurality of content services organizes content selections of the corresponding content service into a unique layout for output via an interface of the corresponding content service;
   configuring, based on the selection of the content service, the unique layout of the content selections of the content service into the default layout of the preferred content source interface; and
   causing output of the preferred content source interface according to the default layout.

2. The method of claim 1, further comprising determining, based on a plurality of user subscriptions, the plurality of content services.

3. The method of claim 1, wherein each content service of the plurality of content services comprises at least one linear content source selection and at least one non-linear content item selection.

4. The method of claim 1, wherein determining the selection of the content service comprises:
   receiving, from a user device, the selection of the content service; or
   determining, by the computing device, the selection of the content service based on one or more user preferences or a default content service associated with the preferred content source interface.

5. The method of claim 1, further comprising:
   causing, based on a selection of another content service of the plurality of content services, the preferred content source interface to discontinue outputting the content selections of the content service according to the default layout; and
   causing the preferred content source interface to output the content selections of the another content service according to the default layout.

6. The method of claim 5, wherein causing the preferred content source interface to output the content selections of the another content service according to the default layout comprises:
   configuring, based on the selection of the another content service, the unique layout of the content selections of the another content service into the default layout of the preferred content source interface; and
   causing output of the preferred content source interface according to the default layout.

7. A method comprising:
   determining, by a computing device, a selection of a content service of a plurality of content services designating the content service as a preferred content service, wherein each content service of the plurality of content services comprises a plurality of content selections;
   causing, based on the selection of the content service, a preferred content source interface to output the plurality of content selections of the preferred content service according to a default layout;
   determining, based on a first user input, a last watched content selection of the plurality of content selections of the preferred content service; and
   causing, based on a second user input, the preferred content source interface to output content associated with the last watched content selection via the preferred content service according to the default layout.

8. The method of claim 7, further comprising determining, based on a plurality of user subscriptions, the plurality of content services.

9. The method of claim 7, wherein each content service of the plurality of content services comprises at least one linear content source selection and at least one non-linear content item selection.

10. The method of claim 7, wherein determining the selection of the content service comprises:
    receiving, from a user device, the selection of the content service; or
    determining, by the computing device, the selection of the content service based on one or more user preferences or a default content service associated with the preferred content source interface.

11. The method of claim 7, wherein the first user input comprises a power off command and the second user input comprises a power on command.

12. The method of claim 7, wherein the last watched content selection comprises content associated with a non-linear content item or a linear content source.

13. The method of claim 12, wherein causing the preferred content source interface to output content associated with the last watched content selection comprises causing the preferred content source interface to output the non-linear content item at a time point in the content when the first user input was received.

14. The method of claim 12, wherein causing the preferred content source interface to output content associated with the last watched content selection comprises causing the preferred content source interface to output current content of the linear content source.

15. A method comprising:
   receiving, by a computing device, a selection of a plurality of content services via a preferred content source interface;
   determining, based on user input of a content selection, an availability of the content selection via one or more content services of the plurality of content services;
   determining, based on the availability of the content selection via the one or more content services of the plurality of content services, a priority associated with each content service of the one or more content services; and
   causing, based on the priority associated with each content service, the preferred content source interface to output content associated with the content selection via a content service of the one or more content services.

16. The method of claim 15, further comprising determining, based on a plurality of user subscriptions, the plurality of content services.

17. The method of claim 15, wherein each content service of the plurality of content services comprises at least one linear content source selection and at least one non-linear content item selection.

18. The method of claim 15, further comprising:
   receiving, from a user device, the selection of the plurality of content services; or
   determining, by the computing device, the selection of the plurality of content services based on one or more user preferences or a default content service associated with the preferred content source interface.

19. The method of claim 15, wherein the content service is a highest priority content service of the one or more content services.

20. The method of claim 15, wherein causing the preferred content source interface to output content associated with the content selection via the content service comprises causing the preferred content source interface to output one or more of a linear content item or a non-linear content item associated with the content selection via the content service.

* * * * *